(12) United States Patent
Amano

(10) Patent No.: US 6,697,115 B1
(45) Date of Patent: Feb. 24, 2004

(54) IMAGE PHOTOGRAPHING APPARATUS FOR ELECTRICALLY PERFORMING INVERSION/NON-INVERSION OF CAPTURED PICTURES

(75) Inventor: Ryosuke Amano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/460,542

(22) Filed: Dec. 14, 1999

(30) Foreign Application Priority Data

Dec. 16, 1998 (JP) .......................................... P10-357085

(51) Int. Cl.⁷ .......................... H04N 5/225; H04N 5/228
(52) U.S. Cl. ..................................... 348/360; 348/222.1
(58) Field of Search .......................... 348/207.99, 222.1, 348/239, 262, 272, 273, 280, 360, 361; 382/293, 295, 296, 297; 358/474, 482, 483; H04N 5/225, 5/228

(56) References Cited

U.S. PATENT DOCUMENTS

| | | | | |
|---|---|---|---|---|
| 4,831,368 A | * | 5/1989 | Masimo | ...................... 382/297 |
| 5,270,831 A | * | 12/1993 | Parulski | ...................... 358/403 |
| 5,351,082 A | | 9/1994 | Kasagi | ...................... 348/294 |
| 5,559,554 A | * | 9/1996 | Uekane | ...................... 348/333.02 |
| 5,798,750 A | | 8/1998 | Ozaki | ...................... 345/656 |
| 6,011,585 A | * | 1/2000 | Anderson | ...................... 348/272 |

FOREIGN PATENT DOCUMENTS

| | | | | |
|---|---|---|---|---|
| EP | 0 456 414 | | 11/1991 | .......... H04N/5/217 |
| WO | WO 99 07140 | | 2/1999 | .......... H04N/5/232 |

* cited by examiner

*Primary Examiner*—Ngoc-Yen Vu
(74) *Attorney, Agent, or Firm*—Frommer Lawrence & Haug LLP; William S. Frommer; Gordon Kessler

(57) ABSTRACT

There is disclosed an image photographing apparatus which makes it possible to electrically perform inversion/non-inversion of positional relation of a captured image according to the kind of an optical lens. The image photographing apparatus of the present invention includes an optical lens for converging an image of an object to be captured, CCDs for receiving the image converged by the optical lens and for converting it into an electric signal, and an image processing portion for electrically performing, on the basis of an inversion/non-inversion control signal, an inversion/non-inversion processing of positional relation which is in the electric signal obtained through conversion at the CCDs and which is at the time when the image was received.

13 Claims, 5 Drawing Sheets

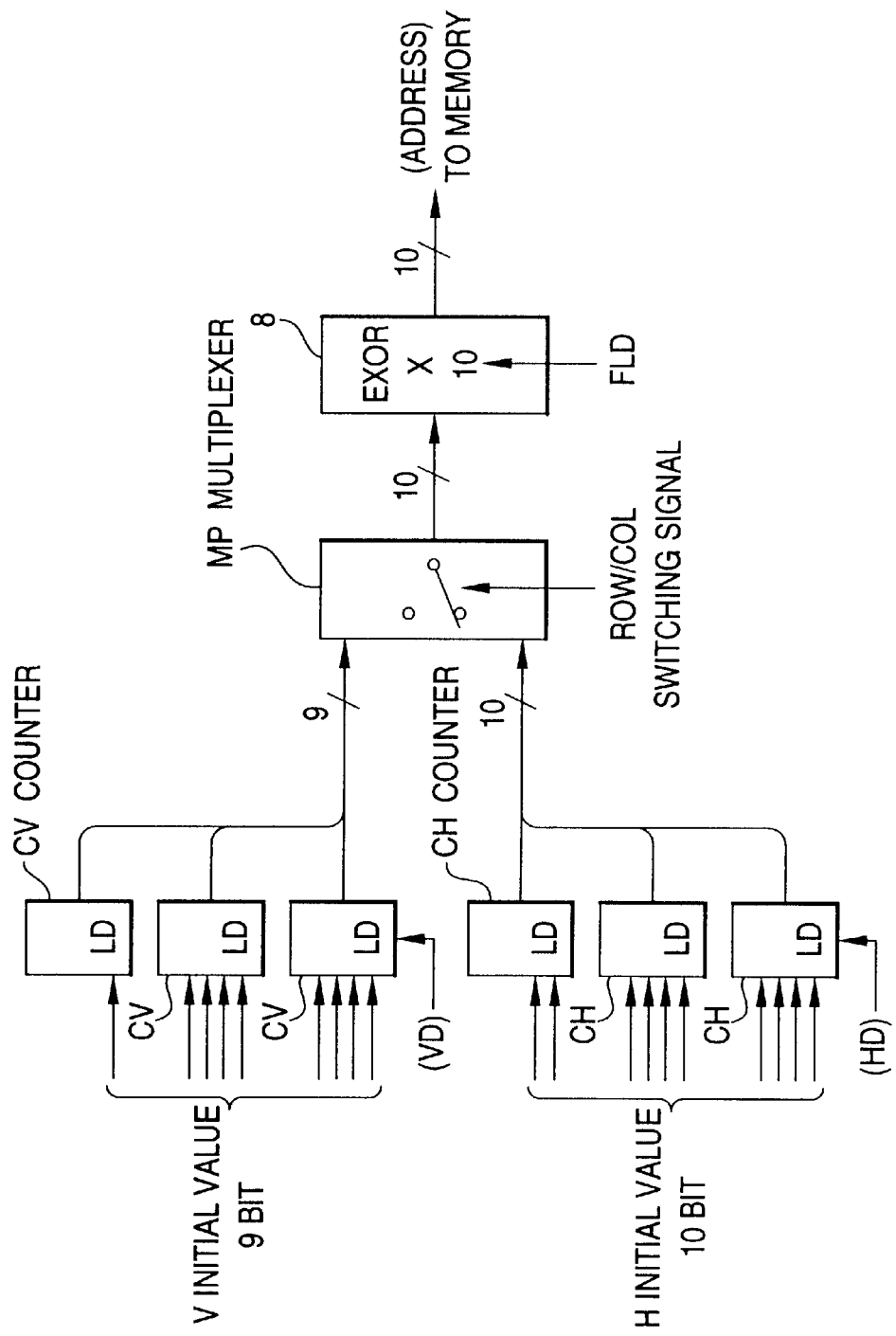

IMAGE PHOTOGRAPHING APPARATUS FOR ELECTRICALLY PERFORMING INVERSION/NON-INVERSION OF CAPTURED PICTURES

BACKGROUND OF THE INVENTION

1. Field of the Invention

The present invention relates to an image photographing apparatus for converting an image obtained through an optical lens into an electric signal and outputting it.

2. Description of the Related Art

In a camera apparatus using a CCD (Charge Coupled Device), an image photographed through an optical lens is imaged on the CCD and is converted into an electric signal, and it is outputted at timing corresponding to a TV system. In this camera apparatus, according to design of an optical system of the lens, there is also a case in which up-and-down and right-and-left relation in imaging is inverted. In general, a lens for a video camera is designed so that such a case does not occur.

However, in lenses which are not originally designed for video cameras, such as a lens for a movie film, there is also such a lens that up-and-down and right-and-left relation in imaging becomes inverted. In the case where such a lens is desired to be used in a video camera, it is necessary to use it after some conversion is performed.

As this kind of technique, conventionally, a technique for inverting right-and-left relation is well known. For example, Japanese Patent Laid-Open No. 78909/1994 discloses an image processing technique for inverting right-and-left relation of a radiation image of a human body obtained through X ray. Japanese Patent Laid-Open No. 191185/1998 discloses a technique and a camera using a line memory to obtain a mirror image signal in which right-and-left relation is inverted. However, both of the publications do not disclose an image processing technique for inverting up-and-down and right-and-left relation of an image.

FIG. 1 is a schematic view for explaining a conventional image photographing apparatus. In this image photographing apparatus, an image captured through a lens 1 is projected onto a screen SC of an optical conversion adapter ADP, and is sent to CCDs 2R, 2G, and 2B of a video camera main body 10 in a state inverted in up-and-down and right-and-left relation through a conversion lens CL.

However, an image photographing apparatus like this has such a large-scale structure that an image photographed through a lens is once imaged on a screen in a conversion adapter, and it is again inverted through a conversion lens, so that the apparatus becomes difficult to use in view of its size and weight. Besides, since the conversion lens is interposed, there also occurs a problem of deterioration in resolution.

SUMMARY OF THE INVENTION

The present invention has been made to solve the foregoing problems and provides an image photographing apparatus. That is, the image photographing apparatus of the invention comprises an optical lens for converging an image of an object to be captured, a photoelectric conversion portion for receiving the image converged through the optical lens and for converting it into an electric signal, and an image processing portion for electrically performing, on the basis of an inversion/non-inversion control signal, an inversion/non-inversion processing of positional relation which is in the electric signal obtained through conversion at the photoelectric conversion portion and which is at a time when the image was received.

In the present invention like this, the image captured through the optical lens is converted into the electric signal at the photoelectric conversion portion, and the positional relation which is in the electric signal obtained through conversion at the photoelectric conversion portion and which is at the time when the image was captured is subjected to the inversion/non-inversion processing at the image processing portion. That is, in the case where an inversion signal is inputted to the image processing portion, the positional relation in the electric signal at the time of capture of the image, which was obtained through conversion at the photoelectric conversion portion, is inverted, and in the case where a non-inversion signal is inputted, the electric signal obtained through conversion at the photoelectric conversion portion is outputted as it is. By this, it becomes possible to electrically perform the inversion/non-inversion of an image according to the kind of the optical lens.

BRIEF DESCRIPTION OF THE DRAWINGS

FIG. 5 is a block diagram for explaining an address control circuit.

BRIEF DESCRIPTION OF THE PREFERRED EMBODIMENTS

Figure 1:
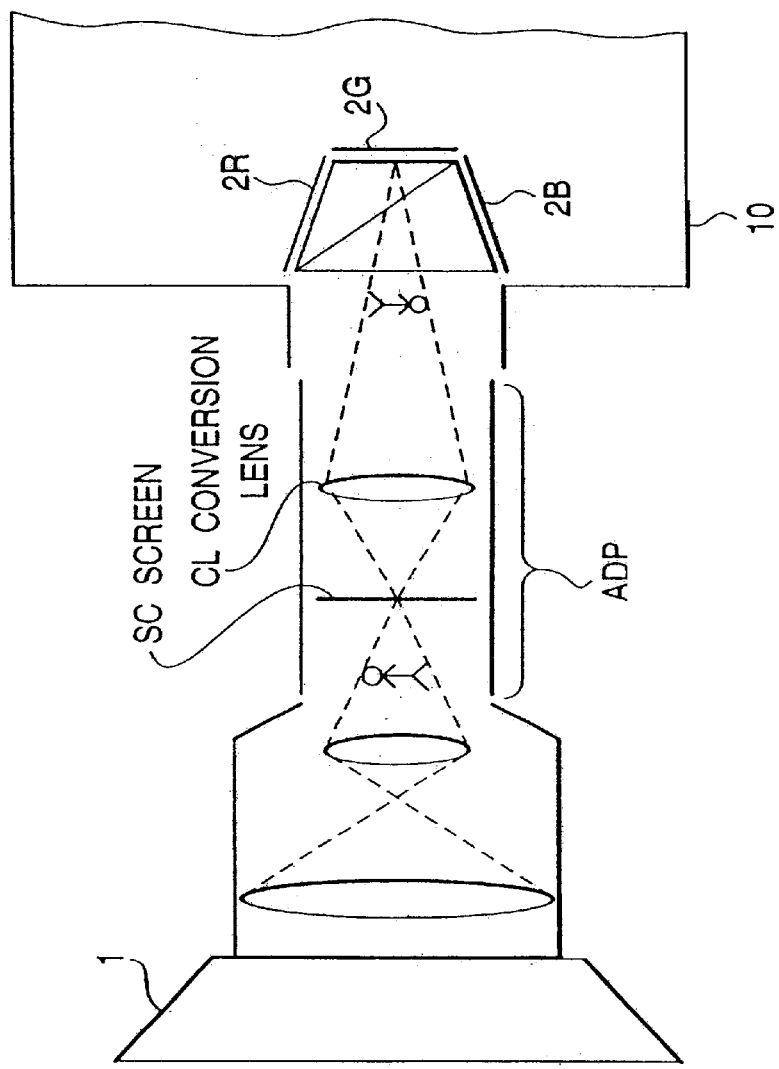
FIG. 1 is a schematic view for explaining a conventional image photographing apparatus.
Figure 2:
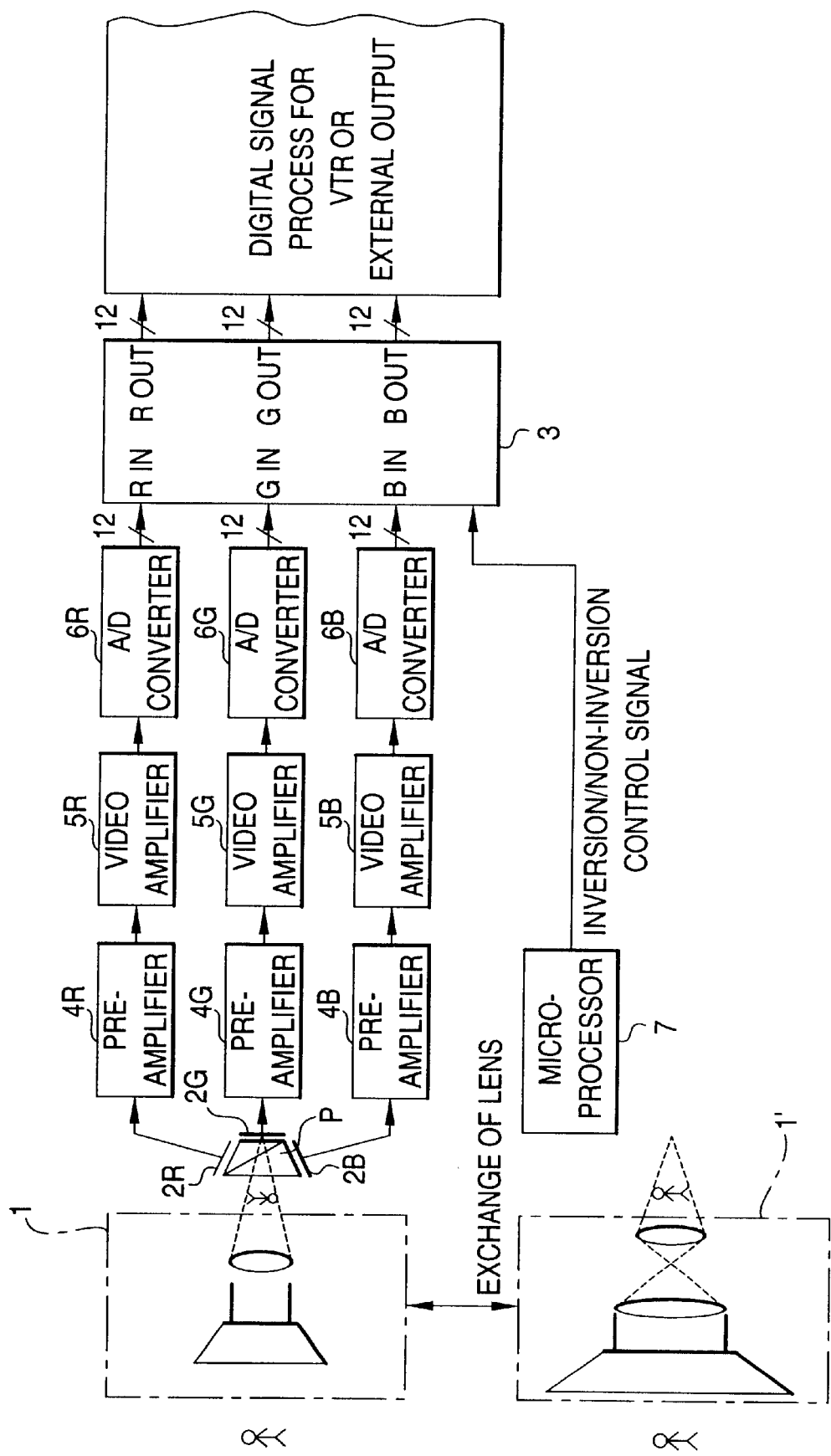
FIG. 2 is a block diagram for explaining a structure of an image photographing apparatus of an embodiment of the invention.

Hereinafter, embodiments of an image photographing apparatus of the invention will be described with reference to the drawings. FIG. 2 is a block diagram for explaining a structure of an image photographing apparatus in an embodiment. That is, this image photographing apparatus has a structure mainly comprising an optical lens 1 for converging an image of a subject as an object to be captured, CCDs 2R, 2G, and 2B for receiving the image converged by this optical lens 1 and for converting it into an electric signal, and an image processing portion 3 for performing an inversion/non-inversion processing of the image.

In the image photographing apparatus of this embodiment, since a color image is captured, this apparatus comprises a prism P for branching and dispersing the image captured through the optical lens 1 in three directions, a CCD 2R for converting a red component among the respective images branched and dispersed in the three directions into an electric signal, a CCD 2G for converting a green component into an electric signal, and a CCD 2B for converting a blue component into an electric signal.

For the purpose of processing the electric signals outputted from the respective CCDs 2R, 2G, and 2B, there are provided, for the respective output lines of the CCDs 2R, 2G, and 2B, preamplifiers 4R, 4G, and 4B, video amplifiers 5R, 5G, and 5B, and A/D converters 6R, 6G, and 6B, and the electric signals after processing are inputted to the image processing portion 3.

On the basis of an inversion/non-inversion signal outputted from a microprocessor 7, the image processing portion performs an inversion/non-inversion processing of positional relation (for example, up-and-down and right-and-left relation) which is in the electric signal outputted from each of the CCDs 2R, 2G, and 2B and subjected to a predetermined processing and which is at the time when the image was received.

Here, the flow of image capturing will be described. That is, the image photographed through the optical lens 1 is separated into the three primary colors of R (red), G (green), and B (blue) by the prism P, each is imaged on the corresponding CCD 2R, 2G, or 2B in an inverted state, and is converted into an electric signal (analog).

Thereafter, the electric signals outputted from the respective CCDs 2R, 2G, and 2B are converted into digital signals by the corresponding preamplifiers 4R, 4G, and 4B, the video amplifiers 5R, 5G, and 5B, and the A/D converters 6R, 6G, and 6B. Incidentally, in this embodiment, although an example in which the signals are converted into 12-bit digital signals by the A/D converters 6R, 6G, and 6B is shown, the invention is not limited to this.

Here, in the case where the optical lens 1 for a normal video camera is used, a non-inversion control signal is inputted to the image processing portion 3 from the microprocessor 7. By this, the digital signals outputted from the A/D converters 6R, 6G, and 6B and inputted to Rin, Gin, and Bin of the image processing portion 3 are outputted from Rout, Gout, and Bout as they are. That is, the inversion processing is not performed, but they are outputted in just the positional relation at the time of capture in the CCDs 2R, 2G, and 2B.

On the other hand, as compared with the optical lens 1 for the normal video camera, in the case where a lens in which up-and-down and right-and-left relation in imaging on the CCDs 2R, 2G, 2B is inverted, such as a lens 1' for a film, is used, an inversion control signal is inputted from the microprocessor 7 to the image processing portion 3. By this, the digital signals outputted from the A/D converters 6R, 6G, and 6B and inputted to the Rin, Gin, and Bin of the image processing portion 3 are respectively outputted from the Rout, Gout, and Bout in the state where the positional relation (up-and-down and right-and-left relation) at the time when the image was received at the CCDs 2R, 2G, and 2B is inverted. That is, it becomes possible to electrically correct the up-and-down and right-and-left relation in imaging by the film lens 1'.

Figure 3:
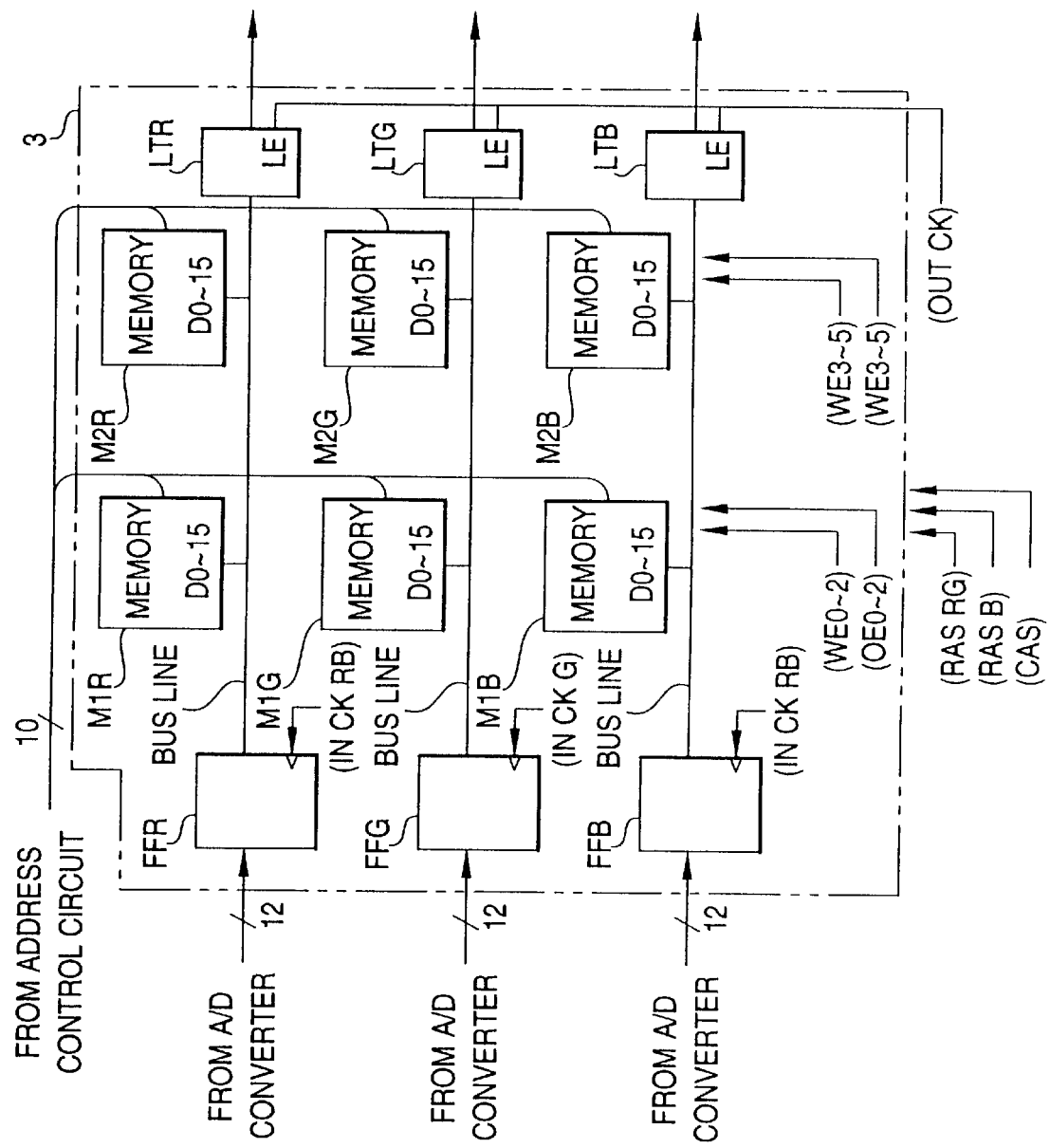
FIG. 3 is a block diagram of a main portion for explaining a signal processing portion.

Next, the signal processing portion will be described. FIG. 3 is a block diagram of a main portion for explaining the signal processing portion. The signal processing portion 3 includes bus lines corresponding to the three signals of R (red), G (green), and B (blue), and is constituted of, correspondingly to the respective bus lines, flip-flops FFR, FFG, and FFB, pairs of memories M1R and M2R, M1G and M2G, and M1B and M2B, and latches LTR, LTG, and LTB.

In this signal processing portion, in the case where inversion of an inputted signal is not performed (non-inversion), the signals having passed through the respective flip-flops FFR, FFG, and FFB for R (red), G (green), and B (blue) are sent to the bus lines to which the memories M1R, M2R, M1G, M2G, M1B, and M2B are connected. In the case of non-inversion, since the memories M1R, M2R, M1G, M2G, M1B, and M2B are in a standby state, the outputs of the memories M1R, M2R, M1G, M2G, M1B, and M2B are in a high impedance state. Thus, the input signals are applied to the respective latches LTR, LTG, and LTB as they are, and they are latched and are outputted.

On the other hand, in the signal processing portion, in the case where inversion of an inputted signal is performed (inversion), the signals having passed through the respective flip-flops FFR, FFG, and FFB for R (red), G (green), and B (blue) are written in one of the two memories M1R and M2R connected to the one bus line, one of the memories M1G and M2G, and one of the memories M1B and M2B. At this time, the other memories M2R or M1R, M2G or M1G, and M2B or M1B perform reading of the inverted signal.

Writing/reading of the two memories is alternately changed for every field of a TV system. Since the bus line is common, writing/reading of the signal flows in time-sharing. For example, a piece of data for writing into one of the memories M1R and M2R, M1G and M2G, or M1B and M2B is outputted from the flip-flop FFR, FFG, or FFB, and immediately after the one of the memories M1R and M2R, M1G and M2G, or M1B and M2B captures it, the flip-flop FFR, FFG, or FFB comes to have a high impedance, the other memory M2R or M1R, M2G or M1G, or M2B or M1B outputs the read data to the bus line, and the latch LTR, LTG, or LTB latches and outputs it to the subsequent processing.

That is, in the case where data are inputted to the flip-flop FFR, FFG, or FFB for every some period (for example, 56 ns), input of the data to one of the memories and output of the data from the other memory are alternately performed on the bus line for every half period (for example, 28 ns), and output of the data is performed by the latch LTR, LTG, or LTB for every former period (for example, 56 ns).

Figure 4:
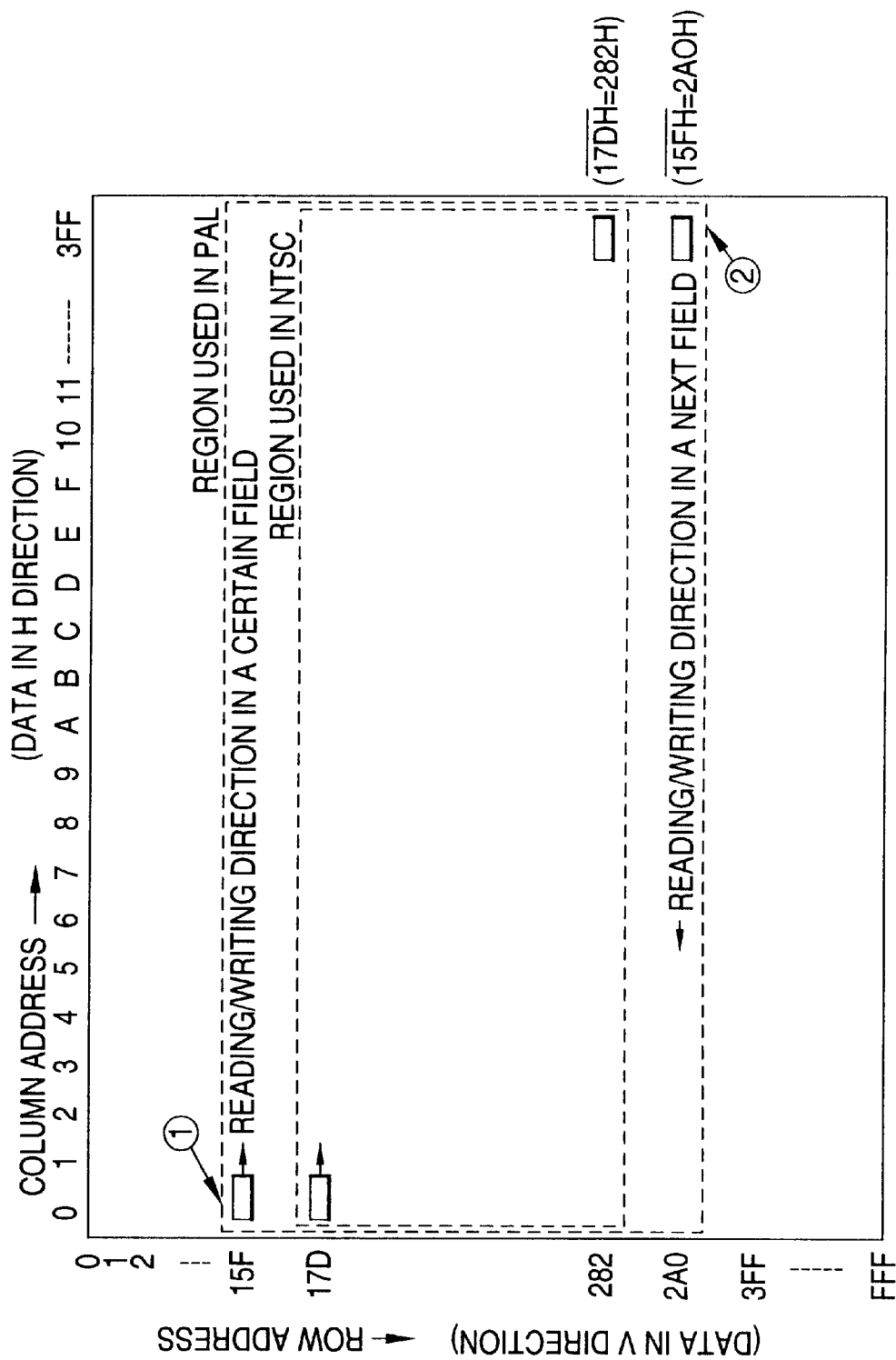
FIG. 4 is a schematic view for explaining writing/reading positions in reach memory.

FIG. 4 is a schematic view for explaining a writing/reading position in each memory. Here, a head address of reading and writing is different according to a TV system (PAL or NTSC) to be handled.

In the case where a signal of a certain field is inputted to a memory, writing of the signal is performed from the position indicated by an arrow ① in the drawing. In this memory, although reading of the signal is performed in the next field, reading at this time is started from the position indicated by an arrow ② in the drawing.

That is, in the case where a signal of a certain field is written in a memory, reading is started in the next field from the opposite side of the previous writing (from the end of writing), so that it becomes possible to output a signal equivalent to the case where the positional relation at the time of image capture is inverted.

In this embodiment, by the two memories connected to the one bus line, writing/reading at one side and reading/writing at the other side are alternately changed for every field. By this, the inputted signal is inverted and outputted with a delay of one field.

Next, control of an address inputted to each memory will be described. FIG. 5 is a block diagram for explaining an address control circuit. This address control circuit comprises a counter CV for addresses (ROW addresses) in the vertical (V) direction in a memory, a counter CH for addresses (COLUMN addresses) in the horizontal (H) direction, a multiplexer MP for switching the ROW address/COLUMN address, and an EXOR (exclusive OR) circuit 8 for performing signal inversion for every field.

In this embodiment, as the memories M1R, M2R, M1G, M2G, M1B, and M2B shown in FIG. 3, dynamic RAMs are used, so that both the horizontal/vertical addresses are multiplexed by the multiplexer MP.

The number of the provided EXOR circuits 8 is equal to the number (in this example, ten) corresponding to the number of output bits from the multiplexer MP, and each takes exclusive OR between a bit signal outputted from the multiplexer MP and a signal (FLD) indicating a field. By this, the value of an address is inverted/non-inverted for every field. That is, since the counters CV and CH produce addresses in ascending order, when their values are inverted by the EXOR circuits 8, the addresses are outputted in descending order, and when their values are non-inverted, the addresses are outputted in ascending order.

Moreover, an initial value corresponding to the address (see the arrows ① and ② in FIG. 4) of the writing/reading start position of a signal corresponding to a TV system (PAL or NTSC) is given to the counter CV in the vertical direction and the counter CH in the horizontal direction.

By such an address control circuit, in the memories M1R, M2R, M1G, M2G, M1B, and M2B shown in FIG. 3, the same address at which the ascending order/descending order are switched for every field is specified, and inversion of the inputted signal is realized by alternate switching of writing/reading, for every field, of the two memories M1R and M2R, M1G and M2G, or M1B and M2B corresponding to the one bus line, as described before.

Such inversion/non-inversion of the signal is designed to be switched in the case where the optical lens is exchanged as described before. For example, since a lens for a large film has a shallow depth of field as compared with a normal lens for a video camera, it is possible to take such a picture that the background of a subject to be photographed is blurred, and only the subject is brought into focus and is accented.

In such a case, although photographing is performed while lenses are exchanged, in the case where a picture is inverted, the inversion/non-inversion processing of a signal is instructed so that the inversion/non-inversion processing described before is executed, so that it becomes possible to electrically perform inversion/non-inversion of the captured picture. That is, it is possible to electrically switch inversion/non-inversion of the picture according to the lens, so that it becomes possible to eliminate the exchange of the whole camera or the use of a conversion adapter.

Incidentally, in the foregoing embodiment, although the description has been made on the example in which the up-and-down and right-and-left relation of a captured signal is inverted, in the EXOR circuit 8 of the address control circuit shown in FIG. 5, if such control is made that only the address in the horizontal direction is inverted, or only the address in the vertical direction is inverted, it becomes possible to obtain an image in which only the right-and-left or the up-and-down relation of the input image is inverted.

As described above, according to the image photographing apparatus of the present invention, the following effects are obtained. That is, in the case where it is desired to exchange an optical lens, the positional relation of a captured image can be electrically inverted without using an optical converting adapter, so that it becomes possible to use various lenses without increasing the size and weight of the image photographing apparatus. Besides, since a converting adapter is not used, it becomes possible to prevent deterioration of picture quality in the case of exchange of lenses.

What is claimed is:

1. An image photographing apparatus, comprising:
   one or more optical lenses adapted to be fitted to said image photographing apparatus for converging an image of a subject, one of said one or more optical lenses being employed at a time;
   a photoelectric conversion portion for receiving the image converged by said employed optical lens and for converting said image into a picture signal;
   a pair of field memories for receiving the picture signal obtained through conversion at said photoelectric conversion portion and for storing the picture signal;
   positionally inverting the picture signal stored in the pair of field memories;
   storing said inverted picture signals in a pair of inverted field memories; and
   reading control means for controlling the process for reading out the picture signal, whereby if the employed lens inverts said image of a subject, the picture signal is read out from said pair of field memories and if the employed lens does not invert said image of a subject, the picture signal is read out from said pair of inverted field memories.

2. The image photographing apparatus according to claim 1, wherein in a case where one of said pair of field memories is in a writing state, the other field memory is in a reading state.

3. The image photographing apparatus according to claim 2, wherein in a case where one or more optical lenses is a lens for a movie film, positional relation of the picture signal is inverted by inversion control means and the signal is read out of said pair of inverted field memories.

4. The image photographing apparatus according to claim 1, wherein the inversion control is such that up-and-down and right-and-left relation of the image is inverted.

5. The image photographing apparatus according to claim 4, wherein when one of each pair of field memories is in a writing state, the other field memory is in a reading state.

6. The image photographing apparatus according to claim 1, wherein at least one of said one or more optical lenses comprise an optical lens system.

7. An image photographing apparatus, comprising:
   an optical lens for converging an image of a subject;
   three CCD elements for converting three primary color signals constituting the image converged by said optical lens into R, G, and B picture signals, respectively;
   latch circuits for temporarily storing the R, G, and B picture signals obtained from said three CCD elements, respectively;
   pairs of field memories for storing the R, G, and B picture signals obtained from said three CCD elements, respectively; and
   reading control means for performing control to read out the R, G, and B picture signals stored in each of said pairs of field memories after positional relation in the picture signal is inverted or non-inverted;
   wherein in a case where the inversion control is performed, the R, G, and B picture signals which are inverted and are read out from said pairs of field memories are outputted, and in a case where the non-inversion control is performed, the R, G, and B picture signals read out from said latch circuits are outputted.

8. The image photographing apparatus according to claim 7, wherein the inversion control is such that up-and-down and right-and-left relation of the image is inverted.

9. The image photographing apparatus according to claim 8, wherein when one of each pair of field is in a writing state, the other field memory is in a reading state.

10. An image photographing apparatus, comprising:
    one or more optical lenses adapted to be fitted to said image photographing apparatus for converging an image of a subject, one or more optical lenses being employed at a time;
    three CCD elements for converting three primary color signals constituting the image converged by said plurality of optical lenses into R, G, and B picture signals, respectively;

latch circuits for temporarily storing the R, G, and B picture signals obtained from said three CCD elements, respectively;

pairs of field memories for storing the R, G, and B picture signals obtained from said three CCD elements, respectively;

positionally inverting the picture signal stored in the pairs of field memories;

storing said inverted picture signals in a pair of inverted field memories; and reading control means for controlling the process for reading out the R, G, and B picture signals, stored in each of said pairs of field memories after positional relation in the picture signal is inverted or non-inverted whereby if the employed lens inverts said image of a subject, the picture signal is read out from said pair of field memories, and if the employed lens does not invert said image of a subject, the picture signal is read out from said pair of inverted field memories.

11. The image photographing apparatus according to claim 10, wherein the inversion control is such that up-and-down and right-and-left relation of the image is inverted.

12. The image photographing apparatus according to claim 11, wherein when one of each pair of field memories is in a writing state, the other field memory is in a reading state.

13. The image photographing apparatus according to claim 10, wherein at least one of said one or more optical lenses comprise an optical lens system.

* * * * *